Oct. 9, 1923.

T. M. ABRAHAM

ACCELERATOR

Filed July 12, 1922

T. M. Abraham
INVENTOR

BY Victor J. Evans
ATTORNEY

WITNESS:

Oct. 9, 1923.

T. M. ABRAHAM

ACCELERATOR

Filed July 12, 1922

T. M. Abraham
INVENTOR

BY Victor J. Evans
ATTORNEY.

WITNESS:

Patented Oct. 9, 1923.

1,470,419

UNITED STATES PATENT OFFICE.

THOMAS M. ABRAHAM, OF MANQUIN, VIRGINIA.

ACCELERATOR.

Application filed July 12, 1922. Serial No. 574,483.

*To all whom it may concern:*

Be it known that I, THOMAS M. ABRAHAM, a citizen of the United States, residing at Manquin, in the county of King William and State of Virginia, have invented new and useful Improvements in Accelerators, of which the following is a specification.

My present invention has reference to a foot throttle for a well-known small type of automobiles.

My object is to produce a device of this character which shall be of an extremely simple construction, cheaply manufactured, easily applied without removing any of the parts of the automobile, which will not interfere with the hand throttle, and which will be thoroughly efficient in operation.

Other objects will present themselves as the nature of the construction is better understood, reference being had to the drawings which accompany and which form part of this application.

In the drawings:—

Figure 1:
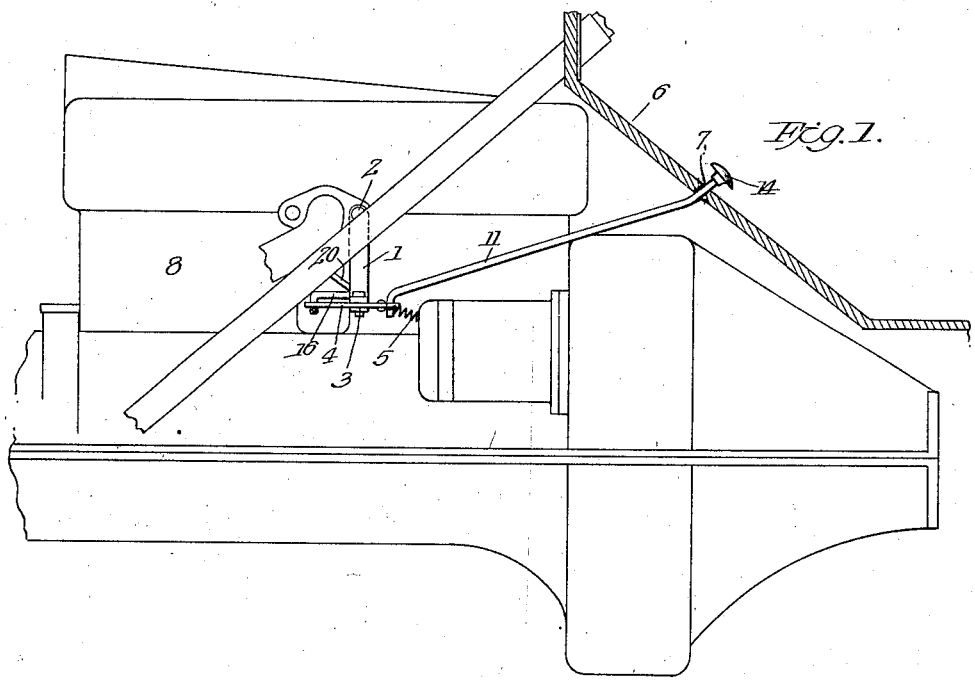
Figure 1 is a side elevation of a sufficient portion of an automobile to illustrate the application of the improvement, parts being in section.
Figure 2:
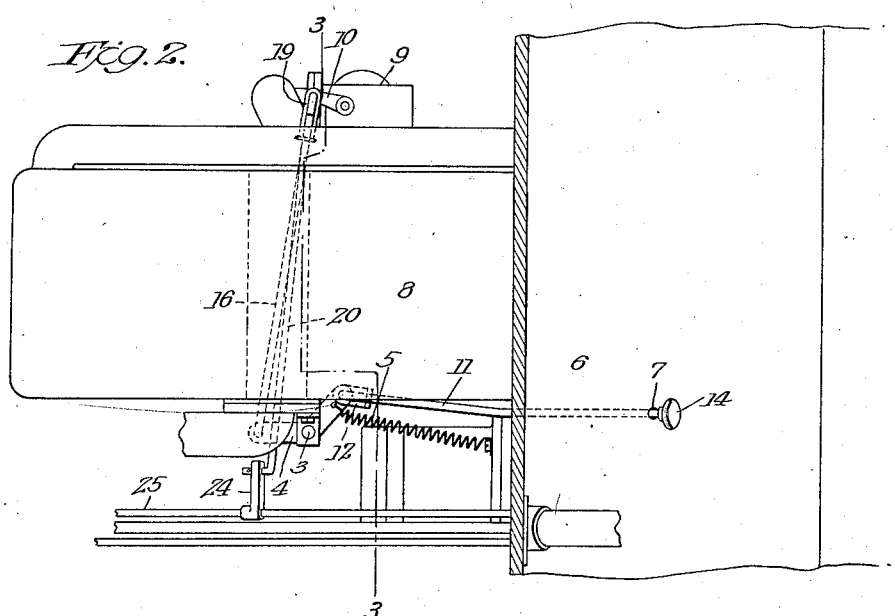
Figure 2 is a similar top plan view.
Figure 3:
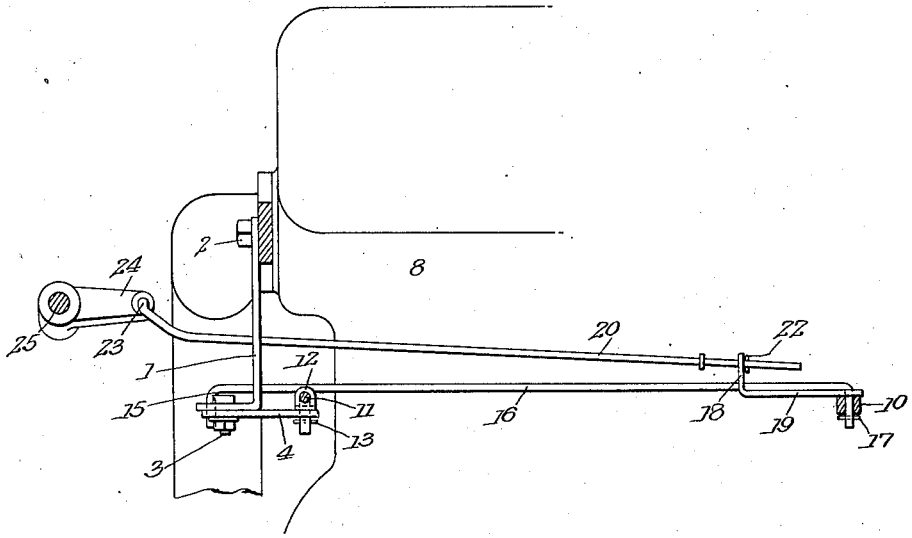
Figure 3 is a sectional view on the line 3—3 of Figure 2, the outline of the engine being shown diagrammatically.
Figure 4:
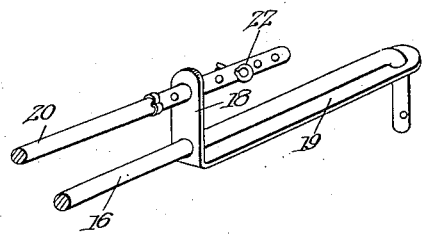
Figure 4 is a perspective view of the plate or bracket and the rods associated therewith.

In the drawings a sufficient portion of the front of an automobile to which the improvement is attached, has been illustrated as has also a sufficient portion of the engine. In carrying out my invention I secure an angle bracket 1 by one of the screws 2 that connect the water conducting hose. To the horizontal lower branch of the bracket 1, I pivot as at 3 an angle lever 4. To one of the arms of the bell crank lever 4 I attach a spring 5, whose opposite end is suitably supported as shown in the drawings.

The carbureter for the motor 8 is indicated by the numeral 9. The carbureter is of the usual construction, the butterfly or throttle valve thereof having a stem projecting through a suitable opening in the top of the carbureter casing and being provided with the usual angle arm 10.

Both arms of the bell crank lever are provided with openings, and there is passed through the opening of the arm provided with the spring 5 the angle end of the foot or throttle lever 11. As a matter of fact the throttle lever has its angle end passing through openings in an angle bracket plate 12, the said angle end of the arm being provided with an opening through which is passed a cotter pin 13. The throttle lever passes through an opening in the dash 6 of the automobile 7 close to the floor board, the inner end of the said rod being provided with a suitable head 14.

The opening in the second arm of the bell crank lever receives therethrough the angle end 15 of a rod 16. The end 16 is provided with an opening through which is passed a cotter pin. Both ends of the rod 16 are arranged at angles, being similarly directed, and the outer angle end passes through the usual opening in the valve lever 10, a cotter pin 17 sustaining the said end of the rod in the said opening. The rod 16 passes through an opening in the upwardly directed or angle end 18 of a plate 19. The plate has an opening adjacent to its outer end, and through this opening the angle outer end of the rod 16 passes. The angle end 18 of the plate 19 is provided with a rounded opening through which passes a rod 20. The rod 20 has its end provided with a plurality of apertures 21 through any one of which there is passed a stop member in the nature of a cotter pin 22. The opposite end of the rod 20 is connected, as at 23 to the angle end 24 of the hand operated throttle rod 25.

It will be apparent that by providing the angle plate 19 a pressure may be exerted by the foot throttle rod 11 for influencing the hand throttle rod 20, the latter passing freely through the opening in the angle end 18 of the plate or bracket 19. Because of the spring 5 the bell crank lever 12 influences the rod 16 to hold the valve of the carbureter 9 open to a position determined by the hand throttle lever, and also the hand throttle lever may be operated to move the rod 20 through the opening permitting the spring to further influence the rod 16, and thus further open the valve of the carbureter. The movement of the lever in a reverse direction will, of course, cause the cotter pin 22 to contact with the angle end 18 of the plate or bracket 19 to move the handle or lever 20 of the valve of the carbureter in an opposite direction and against the pressure of the spring 5.

Having described the invention, I claim:—

1. In combination with an automobile having a hand operated throttle rod, of a foot throttle between the automobile and the carbureter for the motor thereof, including a bell crank lever having one of its arms spring influenced, a throttle rod between the body of the machine and the said arm of the bell crank lever, a second rod connected to the second arm of the bell crank lever and to the handle for the throttle valve of the carbureter, a plate having an angle end connected to said rod, a rod passing freely through the angle end of the plate and pivotally connected to the hand throttle rod, and adjustable stop means between the angle end of the plate and the last mentioned rod.

2. The combination with an automobile having a hand operated rod, and a motor for said machine, of accelerating means between the motor and the body of the automobile, including a removably supported bell crank lever, a spring connected to one of the arms of the bell crank lever and to the automobile, and the arms of the bell crank lever being apertured, a foot throttle rod leading from the automobile having an angle end received through one of the openings in the bell crank lever, an angle bracket having openings receiving the throttle lever and the angle end thereof, means adjustably securing the arm on the lever, a second rod having angle ends one of which passes through the second arm of the bell crank lever and the other being connected to the lever of the throttle valve of the carbureter for the motor of the automobile, means sustaining the ends of the last mentioned rod so connected, an angle plate receiving the last mentioned rod freely therethrough and connected to the said rod, and a rod freely passing through the angle plate connected to the hand operated throttle rod and having its end projecting through the angle plate provided with spaced apertures, and a stop element passing through one of said apertures.

In testimony whereof I affix my signature.

THOMAS M. ABRAHAM.